US012780501B2

(12) United States Patent
Recchia et al.

(10) Patent No.: US 12,780,501 B2
(45) Date of Patent: *Nov. 3, 2026

(54) MULTIWALL PAPER-BASED PACKAGING STRUCTURES

(71) Applicant: PROAMPAC HOLDINGS INC., Cincinnati, OH (US)

(72) Inventors: Raymond J. Recchia, Cincinnati, OH (US); Brian J. Schiermeier, White House, TN (US); Seyed Hesamoddin Tabatabaei, Mason, OH (US); Robert M. Tiepelman, Cottontown, TN (US); Daniel T. Senter, Crestwood, MO (US)

(73) Assignee: ProAmpac Holdings Inc., Cincinnati, OH (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/381,861

(22) Filed: Oct. 19, 2023

(65) Prior Publication Data

US 2024/0132252 A1 Apr. 25, 2024
US 2024/0228118 A9 Jul. 11, 2024

Related U.S. Application Data

(60) Provisional application No. 63/418,919, filed on Oct. 24, 2022.

(51) Int. Cl.
*B65D 30/08* (2006.01)
*B32B 7/14* (2006.01)
(Continued)

(52) U.S. Cl.
CPC ................ *B65D 31/02* (2013.01); *B32B 7/14* (2013.01); *B32B 27/10* (2013.01); *B32B 27/32* (2013.01);
(Continued)

(58) Field of Classification Search
CPC ....... B65D 31/02; B65D 433/10; B65D 31/04
See application file for complete search history.

(56) References Cited

U.S. PATENT DOCUMENTS 1,896,668 A 2/1933 Friedheim
3,784,085 A * 1/1974 Kilgore .................. B32B 29/02
383/105

(Continued)

FOREIGN PATENT DOCUMENTS

DE 1097248 B 1/1961
WO 2000056557 A1 9/2000

(Continued)

OTHER PUBLICATIONS

Iwata, Translation of WO 2017/017856 (Year: 2017).*

(Continued)

*Primary Examiner* — Nathan J Newhouse
*Assistant Examiner* — Nina K Attel
(74) *Attorney, Agent, or Firm* — McLane Middleton, Professional Association

(57) ABSTRACT

A paper-based packaging article includes outer and intermediate paper plies and an inner polymer film ply. A first adhesive layer is disposed between the inner and intermediate paper plies for gluing the inner polymer film ply to the intermediate paper ply. A second adhesive layer is disposed between the intermediate and outer paper plies for gluing the intermediate paper ply to the outer paper ply. The first and second adhesive layers overlap and are coaligned. The outer and intermediate paper plies and the inner polymer film ply are adjoined to form a multiwall structure, wherein the first adhesive layer and the second adhesive layer are coaligned with each other on the multiwall structure. The first adhesive layer comprises a first plurality of adhesive spots and the second adhesive layer comprises a second plurality of adhesive spots, wherein the adhesive spots of the first plurality of
(Continued)

adhesive spots do not overlap with the adhesive spots of the second plurality of adhesive spots.

30 Claims, 4 Drawing Sheets

(51) Int. Cl.

| | |
|---|---|
| ***B32B 27/10*** | (2006.01) |
| ***B32B 27/32*** | (2006.01) |
| ***B32B 27/36*** | (2006.01) |
| ***B32B 29/00*** | (2006.01) |
| ***B32B 37/12*** | (2006.01) |
| ***B65D 30/14*** | (2006.01) |
| ***B65D 30/20*** | (2006.01) |
| ***B65D 65/38*** | (2006.01) |

(52) U.S. Cl.
CPC ............ *B32B 27/36* (2013.01); *B32B 29/005* (2013.01); *B32B 37/1292* (2013.01); *B65D 31/04* (2013.01); *B65D 31/10* (2013.01); *B65D 65/38* (2013.01); *B32B 2255/12* (2013.01); *B32B 2307/4023* (2013.01); *B32B 2307/514* (2013.01); *B32B 2307/7265* (2013.01); *B32B 2317/12* (2013.01); *B32B 2323/04* (2013.01); *B32B 2323/10* (2013.01); *B32B 2367/00* (2013.01); *B32B 2439/46* (2013.01); *B32B 2439/70* (2013.01); *B65D 2565/382* (2013.01); *B65D 2565/385* (2013.01)

(56) References Cited

U.S. PATENT DOCUMENTS

| | | | | |
|---|---|---|---|---|
| 6,299,351 | B1 * | 10/2001 | Warr | B65D 33/08<br>383/120 |
| 8,282,539 | B2 * | 10/2012 | Sharp | B32B 27/302<br>428/34.3 |
| 2016/0214766 | A1 * | 7/2016 | Tiepelman | B65D 31/08 |
| 2018/0170019 | A1 | 6/2018 | Fayet et al. | |
| 2022/0324617 | A1 * | 10/2022 | Beelen | B65D 33/1691 |

FOREIGN PATENT DOCUMENTS

| | | | | |
|---|---|---|---|---|
| WO | WO-0061456 | A2 * | 10/2000 | B65D 81/3469 |
| WO | 2009112225 | A1 | 9/2009 | |

OTHER PUBLICATIONS

Sasazaki, Translation of JP 2001-270014 (Year: 2001).*
English machine translation of German Patent No. DE1097248B.
International Search Report and Written Opinion dated Feb. 7, 2024 received in PCT/US2023/035504.

* cited by examiner

MULTIWALL PAPER-BASED PACKAGING STRUCTURES

RELATED APPLICATION

This application claims the priority benefit of U.S. provisional application No. 63/418,919 filed Oct. 24, 2022. The aforementioned application is incorporated herein by reference in its entirety.

INCORPORATION BY REFERENCE

This application is related to U.S. provisional application Ser. No. 63/248,753 filed Sep. 27, 2021, and U.S. application Ser. No. 17/953,647 filed Sep. 27, 2022. Each of the aforementioned applications is incorporated herein by reference in its entirety.

BACKGROUND

The present invention relates to multiwall, paper-based packaging structures and, in particular, to multiwall paper-based packaging structures that are oil and/or grease resistant, recyclable, and free of fluorochemicals.

Packaging structures having high oil/grease resistance are used for packaging contents having a high oil or grease content in order to prevent oil and/or grease from bleeding through the packaging material and staining the outer portion of the bag. To provide oil/grease resistance and prevent edge wicking, multiwall paper packaging commonly utilizes paper that contains fluorochemicals, such as per- and polyfluoroalkyl substances (PFAS), which have been deemed hazardous. Such paper is generally used as the outer print ply in these packages. In current technologies, there is a polymer liner, such as an oriented polypropylene (OPP) or other plastic liner that is in direct contact with the packaged product to prevent oil/grease from seeping out. However, plastic in combination with cellulosic fiber-based structures has commonly resulted in packaging that is not recyclable in paper recycle streams. The present disclosure contemplates new and improved multiwall paper-based packaging structures and methods which overcome the above-referenced problems and others.

SUMMARY

A paper-based packaging article comprises an outer paper ply, an intermediate paper ply, and an inner polymer film ply. A first adhesive layer is disposed between the inner polymer film ply and the intermediate paper ply for securing the inner polymer film ply to the intermediate paper ply. A second adhesive layer is disposed between the intermediate paper ply and the outer paper ply for securing the intermediate paper ply to the outer paper ply wherein the first adhesive layer and the second adhesive layer are coaligned on the multiwall structure. The outer paper ply, the intermediate paper ply, and the inner polymer film ply are thereby adjoined to form a multiwall structure. The first adhesive layer comprises a first plurality of adhesive spots and the second adhesive layer comprises a second plurality of adhesive spots, wherein the adhesive spots of the first plurality of adhesive spots do not overlap with the adhesive spots of the second plurality of adhesive spots.

In a more limited aspect, the inner polymer film ply is selected from the group consisting of a polyolefin-based polymer film and a polyester-based polymer film.

In another more limited aspect, the inner polymer film ply is formed of oriented polypropylene.

In another more limited aspect, the weight of the inner polymer film ply is in the range of 2% to 10% by weight of the total weight of the paper-based packaging article.

In another more limited aspect, the weight of the inner polymer film ply is in the range of 4% to 8% by weight of the total weight of the paper-based packaging article.

In another more limited aspect, the paper-based packaging article further comprises a moisture barrier layer disposed on at least one surface of one or more of the outer paper ply, the intermediate paper ply, and the inner polymer film ply.

In yet another more limited aspect, the weight of the inner polymer film ply plus the weight of the moisture barrier layer is in the range of 2% to 10% by weight of the total weight of the paper-based packaging article.

In another more limited aspect, the outer paper ply is selected from the group consisting of a highly refined paper substrate which is inherently grease resistant and a paper substrate having one or both of an oil and/or grease resistant coating and an oil and/or grease resistance additive blended into the paper.

In another more limited aspect, each of the inner polymer film ply, intermediate paper ply, and the outer paper ply do not contain any fluorochemicals.

In another more limited aspect, the paper-based packaging article further comprises a printed ink layer disposed on an outward facing surface of the outer paper ply and an optional overprint varnish or lacquer disposed on the printed ink layer.

In yet another more limited aspect, the printed ink layer is selected from the group consisting of a solvent-free ink, energy-cured ink, water-based ink, and a solvent-based ink.

In yet another more limited aspect, the printed ink layer is selected from the group consisting of an electron beam-cured ink and a UV-cured ink.

In another more limited aspect, each of the first plurality of adhesive spots and the second plurality of adhesive spots comprise one or more rows of adhesive spots extending in a transverse direction which is perpendicular to a machine direction, and further wherein the one or more rows of adhesive spots in the first plurality of adhesive spots are offset in the machine direction with respect to the one or more rows of adhesive spots in the second plurality of adhesive spots.

In another more limited aspect, each of the first plurality of adhesive spots and the second plurality of adhesive spots comprise one or more columns of adhesive spots extending in a machine direction which is perpendicular to a transverse direction, and further wherein the one or more columns of adhesive spots in the first plurality of adhesive spots are offset in the transverse direction with respect to the one or more columns of adhesive spots in the second plurality of adhesive spots.

In another more limited aspect, each of the first plurality of adhesive spots and the second plurality of adhesive spots comprise an alternating pattern of adhesive spots and interstices, and further wherein the adhesive spots of the first plurality of adhesive spots are aligned with the interstices of the second plurality of adhesive spots.

In another more limited aspect, the paper-based packaging article is a bag.

In yet another more limited aspect, the bag has a front panel, a back panel, and opposing side panels joining the front and back panels.

In yet another more limited aspect, the opposing side panels are gusseted.

In yet another more limited aspect, the bag is closed at a first end and open at a second end opposite the first end.

In another more limited aspect, the paper-based packaging article is selected from the group consisting of a bag, pouch, overwrap, self-opening sack (SOS) bag, pinch bottom pouch, pinch bottom open mouth (PBOM) bag, and quad seal side gusseted bag.

In another more limited aspect, the paper-based packaging article is a pet food bag.

In yet another more limited aspect, the multiwall structure is configured to resist bleed through of oil and/or grease from within the paper-based packaging article.

In another more limited aspect, the multiwall structure includes: a pair of substantially rectangular, opposing front and back panels, each having top and bottom ends and opposing side edges extending between the top and bottom ends; a pair of opposing side panels joining the opposing side edges of the front and back panels; and a closure securing the bottom ends of the front and back panels and the pair of side panels to close one end of the bag.

In yet another more limited aspect, the first and second adhesive layers are disposed on one or both of the front panel and the back panel.

In yet another more limited aspect, each of the side panels has a longitudinal accordion pleat defining a longitudinal gusset fold therein.

In yet another more limited aspect, the paper-based packaging article is a pet food bag.

In a further aspect, a method of forming a packaging article comprises providing an outer web formed of a first paper material, an intermediate web formed of a second paper material, and an inner web formed of a polymer film. A first adhesive layer is applied to a first predefined region on one of an outward facing surface of the inner web and an inward facing surface of the intermediate web. A second adhesive layer is applied to a second predefined region on one of an outward facing surface of the intermediate web and an inward facing surface of the outer web. The outer web, intermediate web, and inner web are glued to form a multiwall structure comprising an outer paper ply, an intermediate paper ply, and an inner polymer film ply, wherein the first predefined region and the second predefined region are coaligned. The first adhesive layer comprises a first plurality of adhesive spots and the second adhesive layer comprises a second plurality of adhesive spots, wherein the adhesive spots of the first plurality of adhesive spots do not overlap with the adhesive spots of the second plurality of adhesive spots.

In a more limited aspect, the multiwall structure is folded to form a pair of substantially rectangular, opposing front and back panels, each having top and bottom ends and opposing side edges extending between the top and bottom ends and a pair of opposing side panels joining the opposing side edges of the front and back panels. The bottom ends of the front and back panels and the pair of side panels are secured to close one end of the bag.

In a further aspect, a paper-based packaging article comprises an outer paper ply, an intermediate paper ply, and an inner polymer film ply. A first adhesive layer is disposed between the inner polymer film ply and the intermediate paper ply to secure the inner polymer film ply to the intermediate paper ply. A second adhesive layer is disposed between the intermediate paper ply and the outer paper ply to secure the intermediate paper ply to the outer paper ply. The outer paper ply, the intermediate paper ply, and the inner polymer film ply are thereby adjoined to form a multiwall structure which is repulpable, recyclable, and grease resistant.

In a more limited aspect, the first adhesive layer and the second adhesive layer are coaligned on the multiwall structure and wherein the first adhesive layer comprises a first plurality of adhesive spots and the second adhesive layer comprises a second plurality of adhesive spots, wherein the adhesive spots of the first plurality of adhesive spots do not overlap with the adhesive spots of the second plurality of adhesive spots.

One advantage of the present development resides in its excellent levels of oil and/or grease resistance and prevention of edge wicking.

Another advantage of the present development is found in that paper containing PFAS chemicals is not required.

Yet another advantage of the present development is the packaging structures herein are recyclable in paper recycle streams.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings, which are not necessarily to scale, are only for purposes of illustrating preferred embodiments and are not to be construed as limiting the invention.

DETAILED DESCRIPTION OF THE PREFERRED EMBODIMENTS

The terms "a" or "an," as used herein, are defined as one or more than one. The term "another," as used herein, is defined as at least a second or more. The terms "including"

and/or "having" as used herein, are defined as comprising (i.e., open transition). As used herein, the terms "joined," "coupled," "operatively coupled," and the like, are defined as indirectly or directly connected, unless specifically stated otherwise.

As used herein, "paper-based" means a material or structure primarily comprising cellulosic fibers, e.g., derived from wood pulp, and wherein the amount of plastic materials, such as polyethylene, nylon, polypropylene, polyester, and others, are sufficiently low so as not to impede recyclability in paper recycling streams.

As used herein, "recyclable" may refer to a product that is eligible for acceptance into paper recycling programs, including curbside collection programs and recycling programs that use drop-off locations, including products that comply with one or more promulgated standards or guidelines for recyclability, and including materials that are sufficiently free of plastic materials, such as polyethylene, nylon, polypropylene, polyester, and others which would impede recyclability.

As used herein, "repulpable" may refer to a product that can be reused or remade into paper (e.g., at a paper mill), including products that comply with one or more promulgated standards or guidelines for repulpability, and including materials that are sufficiently free of plastic materials, such as polyethylene, nylon, polypropylene, polyester, and others which would impede repulpability.

As used herein, the terms "grease resistant" or "grease resistance" refer to the character of the PVOH barrier layer in blocking or impeding the absorption or transmission of grease or oil in any significant quantity.

All numbers herein are assumed to be modified by the term "about," unless stated otherwise. The recitation of numerical ranges by endpoints includes all numbers subsumed within that range (e.g., 1 to 5 includes, inter alia, 1, 1.5, 2, 2.75, 3, 3.80, 4, and 5).

Accordingly, unless indicated to the contrary, the numerical parameters set forth in the present specification and attached claims are approximations that can vary depending upon the desired properties sought to be obtained by the presently disclosed subject matter.

As used herein, the term "about," when referring to a value can encompass variations of, in some embodiments ±20%, in some embodiments ±10%, in some embodiments ±5%, in some embodiments ±1%, in some embodiments ±0.5%, in some embodiments ±0.1%, and in some embodiments to ±0.01%, from the specified amount, as such variations are appropriate in the disclosed materials and methods.

All compositional percentages used herein are presented on a "by weight" basis, unless specifically stated otherwise. All basis weights herein are pounds per 3000 square foot ream unless specifically stated otherwise.

Figure 1:
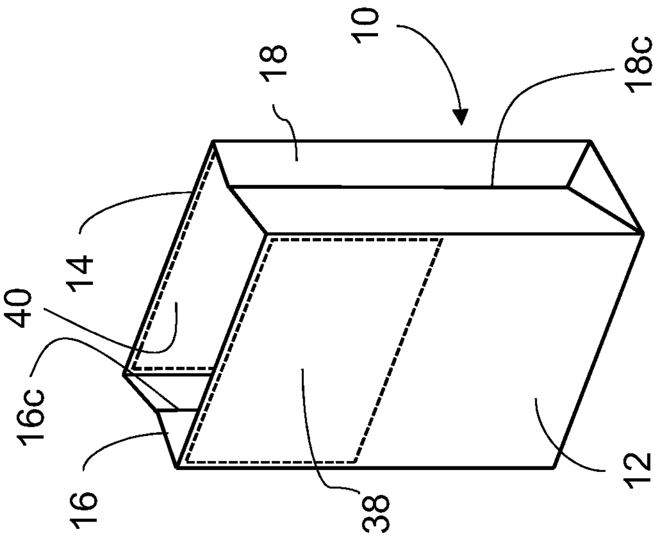
FIG. 1 is an isometric view of an exemplary three-ply multiwall packaging structure of the present invention.

Referring now to the drawings, wherein like reference numerals are used to describe like or analogous items, FIG. 1 illustrates an exemplary multiwall packaging structure, which is a bag construction in the depicted embodiment, and is designated generally as reference numeral 10. The structure 10 includes a pair of generally opposing, rectangular front and back panels 12 and 14, respectively. The front panel 12 and the back panel 14 are joined at opposite edges by gusseted side panels 16 and 18. The multiwall paper-based packaging structures herein are advantageously formed into packages (e.g. pouches, bags, overwraps) that protect consumable products (e.g. pet food, baking mixes, flour, sugar, and the like). Although the present invention is illustrated by way of reference to a preferred packaging structure 10 which comprises a self-opening sack (SOS), it will be recognized that the present development is amenable to other multiwall packaging structures, including pinch bottom type pouches or bags, e.g., pinch bottom open mouth (PBOM) bags, V-quad seal side gusseted bags or pouches, sewn open mouth (SOM) bags, pasted valve stepped end (PVSE) bags, satchel bottom open mouth (Webb pinch) bags, and others.

Figure 2:
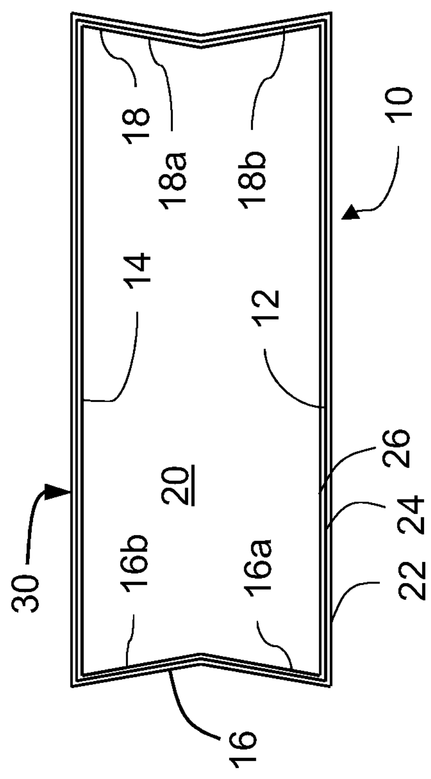
FIG. 2 is a cross-sectional view of the packaging structure appearing in FIG. 1.

Referring to FIG. 2, and with continued reference to FIG. 1, the gusseted side panels 16 and 18 comprise first and second panel portions 16*a*, 16*b* and 18*a*, 18*b*, respectively. The panel portions 16*a*, 16*b* and 18*a*, 18*b* are joined along respective fold lines 16*c* and 18*c*. The fold lines 16*c* and 18*c* enable the gusseted side panels 16 and 18 to be folded inwardly with an accordion pleat. When the structure 10 is folded in a collapsed, flat configuration, the gusseted panels 16 and 18 are disposed between the front panel 12 and the back panel 14. The front panel 12, back panel 14, gusseted side panel 16, and gusseted side panel 18 are adhesively secured together to close and seal the bottom end 20 of the bag 10. The panels 12, 14, 16, and 18 of the bag 10 are constructed with a multiwall or multi-ply structure.

Figure 3B:
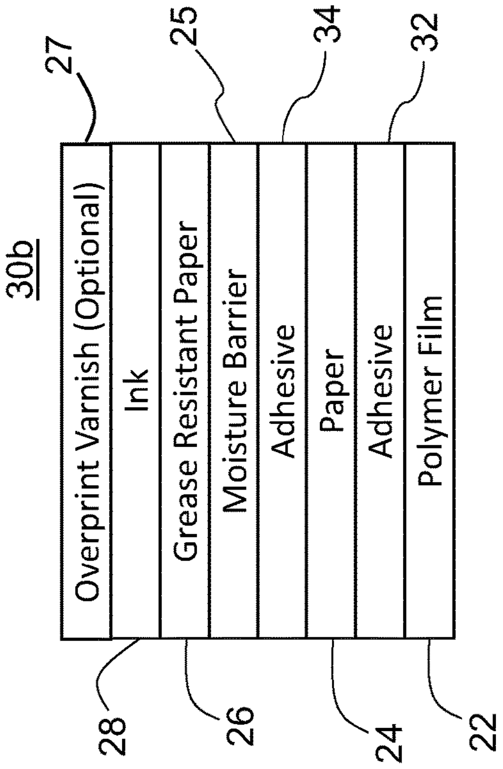
FIG. 3B is a side cross-sectional view of an exemplary second embodiment multiwall packaging material.
Figure 3C:
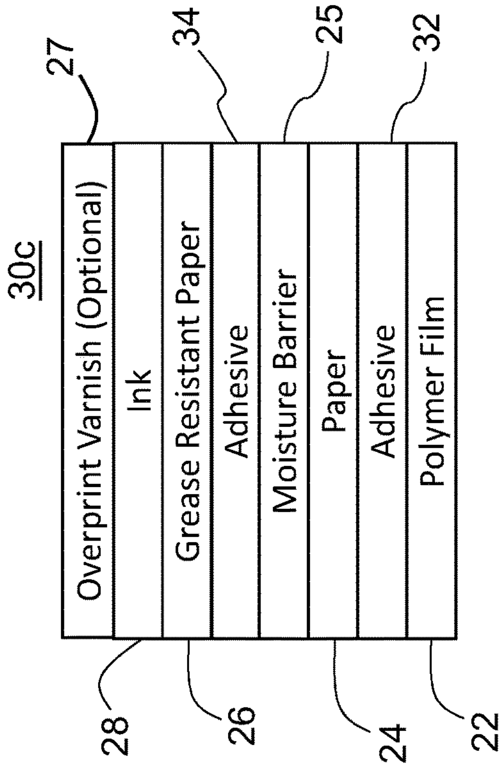
FIG. 3C is a side cross-sectional view of an exemplary third embodiment multiwall packaging material.
Figure 3A:
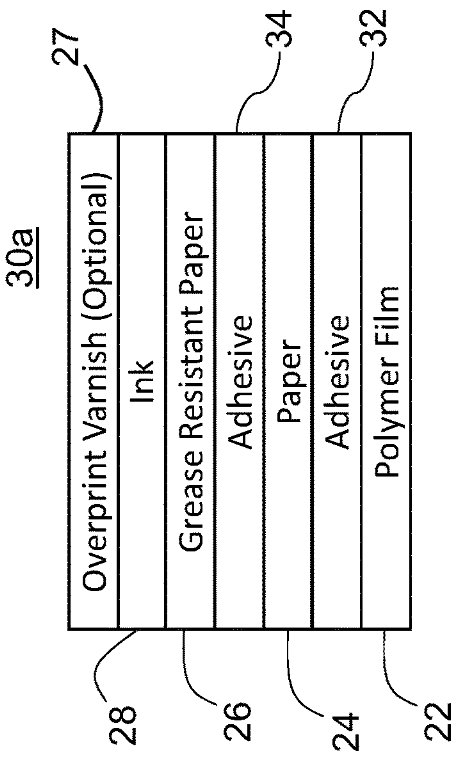
FIG. 3A is a side cross-sectional view of an exemplary first embodiment multiwall packaging material.

As shown in FIG. 3A, a multiwall structure 30*a* comprises an inner polymer film ply 22, an intermediate paper ply 24, and an outer paper ply 26. A first adhesive layer 32 is disposed between the inner polymer film ply 22 and the intermediate paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish or lacquer overprint layer 27 is applied over the ink layer 28, e.g., to protect the ink layer 28 from scuffing and rubbing off and/or to provide a desired matte or gloss effect.

The inner polymer film ply 22, as well as the moisture barrier layer 25 in the embodiments of FIGS. 3B-3F, provide the film structures herein with good moisture barrier properties, which is particularly advantageous for packaging applications where the product to be packaged is subject to drying out, e.g., in low relative humidity environments and/or where it is desired to minimize water uptake, e.g., in high relative humidity environments by reducing the water vapor transmission rate (WVTR) of the packaging structure. Although FIGS. 3B-3F illustrate packaging structures having a single moisture barrier layer 25, it will be recognized that other embodiments are contemplated having multiple moisture barrier layers 25.

As shown in FIG. 3B, a multiwall structure 30*b*, which provides increased moisture resistance, comprises an inner polymer film ply 22, an intermediate paper ply 24, and an outer paper ply 26. A first adhesive layer 32 is disposed between the inner polymer film ply 22 and the intermediate paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28. A moisture barrier layer 25 is disposed on the interior facing surface of the grease resistant paper layer 26. The moisture barrier layer 25 may be brought on to the interior facing surface of the grease resistant paper layer 26 via lamination, coating, or extrusion coating.

As shown in FIG. 3C, a multiwall structure 30*c* which provides increased moisture resistance, comprises an inner polymer film ply 22, an intermediate paper ply 24, and an outer paper ply 26. A first adhesive layer 32 is disposed between the inner polymer film ply 22 and the intermediate paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28. A moisture barrier layer 25 is disposed on the outward facing surface of the paper layer 24. The moisture barrier layer 25 may be brought on to the outward facing surface of the grease resistant paper layer 26 via lamination, coating, or extrusion coating.

Figure 3D:
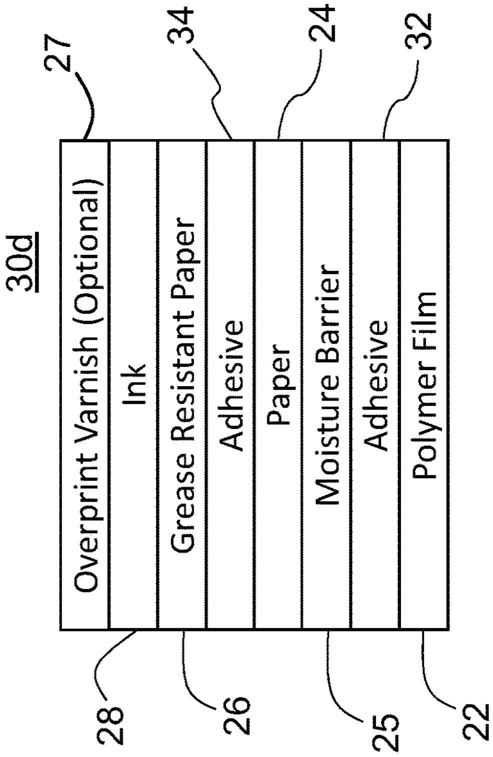
FIG. 3D is a side cross-sectional view of an exemplary fourth embodiment multiwall packaging material.

As shown in FIG. 3D, a multiwall structure 30*d* which provides increased moisture resistance, comprises an inner polymer film ply 22, an intermediate paper ply 24, and an outer paper ply 26. A first adhesive layer 32 is disposed between the inner polymer film ply 22 and the intermediate paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28. A moisture barrier layer 25 is disposed on the inward facing surface of the paper layer 24. The moisture barrier layer 25 may be brought on to the interior facing surface of the intermediate paper layer 24 via lamination, coating, or extrusion coating.

Figure 3E:
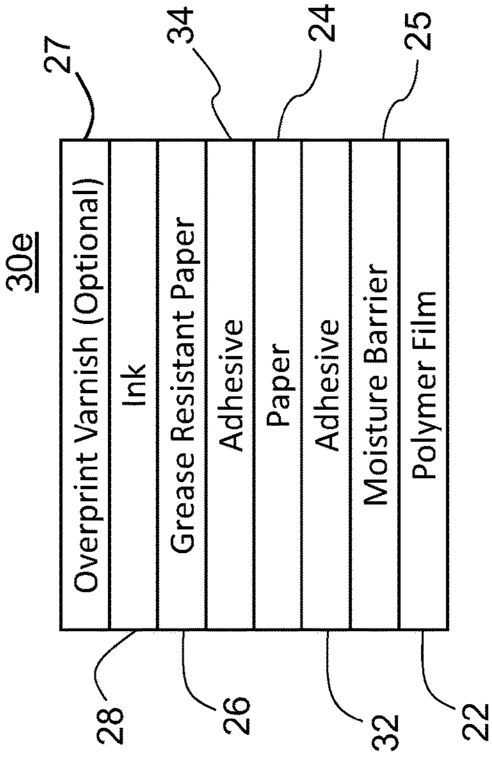
FIG. 3E is a side cross-sectional view of an exemplary fifth embodiment multiwall packaging material.

As shown in FIG. 3E, a multiwall structure 30*e* which provides increased moisture resistance, comprises an inner polymer film ply 22, an intermediate paper ply 24, and an outer paper ply 26. A first adhesive layer 32 is disposed between the inner polymer film ply 22 and the paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28. A moisture barrier layer 25 is disposed on the outward facing surface of the inner polymer film ply 22. The moisture barrier layer 25 may be brought on to the outward facing surface of the inner polymer film ply 22 via lamination, coating, extrusion coating, or coextrusion.

Figure 3F:
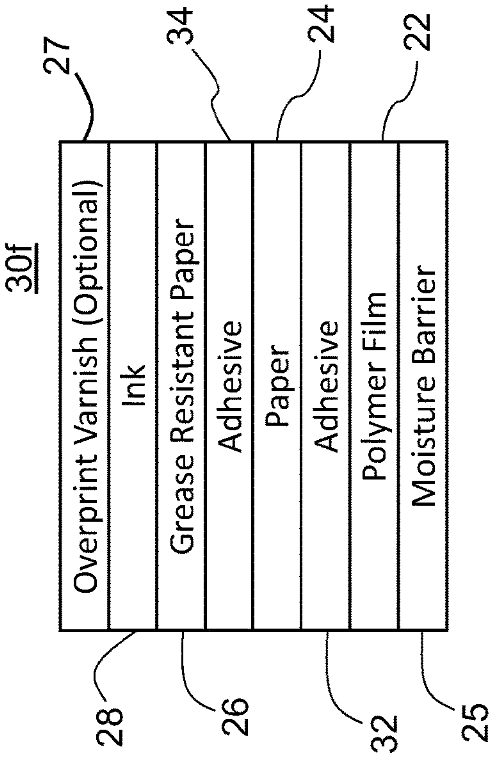
FIG. 3F is a side cross-sectional view of an exemplary sixth embodiment multiwall packaging material.

As shown in FIG. 3F, a multiwall structure 30*f* which provides increased moisture resistance, comprises an inner polymer film ply 22, an intermediate paper ply 24, and an outer paper ply 26. A first adhesive layer 32 is disposed between the inner polymer film ply 22 and the intermediate paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28. A moisture barrier layer 25 is disposed on the inward facing, i.e., product-contacting, surface of the inner polymer film ply 22. The moisture barrier layer 25 may be brought on to the inward facing surface of the inner polymer film ply 22 via lamination, coating, extrusion coating, or coextrusion.

The outer paper ply 26 comprises a fluorochemical free paper. In embodiments, the outer paper ply 26 comprises a highly refined paper, e.g., similar to glassine paper, which imparts grease-resistance to the structure without fluorocarbon treatment. In such embodiments, the grease resistant properties of the ply 26 are the result of tight packing of the highly refined fibers of the sheet, thereby physically preventing the migration of grease into and through the ply 26. In embodiments, the outer paper ply 26 comprises a fluorochemical free paper which has a coating applied to enhance oil/grease resistance and edge wicking resistance. In certain embodiments, the outer paper ply 26 is a highly refined and calendared paper. In certain embodiments, the coating is a bio-based coating such as starches, sugar cane based coatings and the like. In certain embodiments, the outer paper ply 26 is an extensible paper to provide improved puncture resistance and tensile strength. In certain embodiments, the outer paper ply 26 is a bleached Kraft paper or a natural Kraft paper. In certain embodiments, the outer paper ply 26 is a commercially available grease resistant, PFAS-free paper, such as GREASE-GARD™ FLUOROFREE™ paper, which is available from Ahlstrom-Munksjö of Helsinki, Finland.

As an alternative to or in addition to the aforementioned oil/grease resistant coating layer, one or more oil and/or grease resistance additives may be added to the fibrous composition during the paper making process, for example, at levels up to about 2% by weight. Exemplary oil and/or grease resistance additives include, for example, oxidized polyethylenes, latex, SMA (styrene maleic anhydride), polyamide, waxes, alginate, proteins, carboxymethyl cellulose (CMC), hydroxymethyl cellulose (HMC), and so forth.

The outer paper ply 26 has an ink layer 28 applied on the exterior surface. The outer paper ply 26 is preferably a white or bleached paper to provide improved printing characteristics. The bleached paper also has a lower stiffness as compared to its natural Kraft/brown counterpart to allow for improved runnability on filling machines. In embodiments, the basis weight of the outer paper ply 26 is in the range of 25 #/ream to 80 #/ream and preferably 40 #/ream, although other basis weights are contemplated.

The ink layer 28 is a surface printed ink layer. In certain embodiments, the ink layer 28 is applied using a solventless ink system, such as energy-cured inks (e.g., electron beam cured-inks or UV radiation-cured inks). In certain embodiments, the ink layer 28 is applied using water-based inks. In certain embodiments, an optional varnish or over lacquer layer 27 is applied to the ink layer 28 to protect the ink(s) from scuffs and rubbing off. In embodiments, the overprint varnish or lacquer also increases the strength of the bag, enhances oil and grease resistance, and/or improves moisture barrier properties of the bag.

In certain embodiments, solventless ink systems or water-based inks are utilized to prevent residual, unevaporated ink solvents from permeating the plies of the bag 10. For example, when utilizing the packaging constructions 10 herein for pet food applications, it has been found that when solvent free ink systems such as energy cured inks and water-based inks are used, there are minimal effects on palatability (PAL) testing with animals.

The printing ink layer 28 can be applied to the outer surface of the outer paper ply 26 via any conventional printing method as would be understood by persons skilled in the art, including without limitation, using a rotogravure printing apparatus, flexographic printing apparatus, offset printing apparatus, digital printing apparatus, ink jet printing apparatus, or the like.

The intermediate paper ply 24 may be a bleached or unbleached paper layer which contains no fluorochemical materials. In certain embodiments, the intermediate paper ply 24 is an extensible paper. In certain embodiments, the intermediate paper ply 24 is a Natural Kraft paper. In certain embodiments, the intermediate paper ply 24 is a bleached Kraft paper, which provides an improved printing appearance on the outer surface, although unbleached Kraft paper is also contemplated. In embodiments, the basis weight of the intermediate paper ply 24 is in the range of 25 #/ream to 80 #/ream and preferably 60 #/ream, although other basis weights are contemplated.

In certain embodiments, the inner polymer film ply 22 is formed of a polyolefin-based polymer material, preferably a polyethylene-based or polypropylene-based polymer material. In embodiments, the moisture barrier layer 25 may comprise a monomaterial or a blend. In certain embodiments, the moisture barrier layer 25 is formed of polypropylene, oriented polypropylene (OPP), biaxially-oriented polypropylene (BOPP), high-density polyethylene (HDPE), medium density polyethylene (MDPE), linear medium density polyethylene (LMDPE), low-density polyethylene (LDPE), linear low-density polyethylene (LLDPE), very low-density polyethylene (VLDPE), metallocene linear low-density polyethylene (mLLDPE), polyolefin plastomer (POP), or blends thereof as well as coextrusions thereof. In certain embodiments, the inner polymer film ply 22 is formed of a polyester-based polymer material, preferably polybutylene terephthalate (PBT), polyethylene terephthalate (PET), or a blend thereof. Additives such as colorants can be used. In embodiments, the gauge thickness of the inner polymer film ply 22 is in the range of 30 gauge to 60 gauge and preferably 48 gauge, although other gauge thicknesses are also contemplated.

In embodiments, the composition of the laminated packaging structure **30*a* is such that total weight of the inner polymer film ply 22 is in the range of 2% to 10% by weight of the total weight of the packaging structure 30*a*. In embodiments, the composition of the laminated packaging structure 30*a* is such that total weight of the inner polymer film ply 22 is in the range of 3% to 9% by weight of the total weight of the packaging structure 30*a*. In embodiments, the composition of the laminated packaging structure 30*a* is such that total weight of the inner polymer film ply 22 is in the range of 4% to 8% by weight of the total weight of the packaging structure 30*a*. In embodiments, the composition of the laminated packaging structure 30*a* is such that total weight of the inner polymer film ply 22 is in the range of 5% to 7% by weight of the total weight of the packaging structure 30*a*. In embodiments, the composition of the laminated packaging structure 30*a* is such that total weight of the inner polymer film ply 22 is about 6% by weight of the total weight of the packaging structure 30*a*. In certain embodiments, the composition of the laminated packaging structure 30*a* is such that total weight of the inner polymer film ply 22** does not exceed a maximum amount of plastics or non-paper components in accordance with an established standard or guideline for paper recyclability and/or repulpability.

In embodiments, the composition of each of the laminated packaging structures **30*b*-30*f* is such that total weight of the inner polymer film ply 22 plus the weight of the moisture barrier layer 25 is in the range of 2% to 10% by weight of the total weight of the packaging structure 30*b*-30*f*, respectively. In embodiments, the composition of each of the laminated packaging structures 30*b*-30*f* is such that total weight of the inner polymer film ply 22 plus the weight of the moisture barrier layer 25 is in the range of 3% to 9% by weight of the total weight of the packaging structure 30*b*-30*f*, respectively. In embodiments, the composition of the laminated packaging structure 30*b*-30*f* is such that total weight of the inner polymer film ply 22 is in the range of 4% to 8% by weight of the total weight of the packaging structure 30*b*-30*f*, respectively. In embodiments, the composition of the laminated packaging structure 30*b*-30*f* is such that total weight of the inner polymer film ply 22 is in the range of 5% to 7% by weight of the total weight of the packaging structure 30*b*-30*f*, respectively. In embodiments, the composition of the laminated packaging structure 30*b*-30*f* is such that total weight of the inner polymer film ply 22 is about 6% by weight of the total weight of the packaging structure 30*b*-30*f*, respectively. In certain embodiments, the composition of the laminated packaging structure 30*a*-30*f* is such that total weight of the inner polymer film ply 22** does not exceed a maximum amount of plastics or non-paper components in accordance with an established standard or guideline for paper recyclability and/or repulpability.

In the manufacture of the packaging structure 10, each of the plies 22, 24, and 26 are separate webs which are glued together to form a single, multi-ply web 30. The inner polymer film ply 22 is glued to the intermediate paper ply 24 using a first adhesive layer 32, which is disposed in between the outward facing surface of the inner polymer film ply 22 and the inward facing surface of the intermediate paper ply 24. The intermediate paper ply 24 is glued to the outer paper ply 26 using a second adhesive layer 34, which is disposed in between the outward facing surface of the intermediate paper ply 24 and the inward facing surface of the outer paper ply 26.

The first adhesive layer 32 is applied as a plurality of adhesive spots **36*a* forming a first pattern and the second adhesive layer 34 is applied as a plurality of adhesive spots 36*b* forming a second pattern. In certain embodiments, the adhesive layers 32, 34, are not applied over the entire area of the web 30 or over the entire area of a form or blank to be folded and glued to form the bag 10, but rather, the adhesive patterns 32 and 34 are applied within a designated adhesive area or region 38 on the front panel 12 and within a designated adhesive area or region 40 on the rear panel 14. In this manner, the amount of adhesive used to glue the plies 22, 24, and 26** is reduced.

The moisture barrier layer 25 is a coating film layer having an adequate thickness and density which is effective to provide a low permeability of water vapor and thereby reduce the rate of water transmission through the multilayer structure. In embodiments, the moisture barrier layer comprises a polyolefin such as polyethylene, polypropylene, and blends thereof. Exemplary moisture barrier layer compositions include high-density polyethylene (HDPE), medium density polyethylene (MDPE), low-density polyethylene (LDPE), linear polyethylenes such as linear low-density polyethylene (LLDPE), polypropylene (PP), oriented polypropylene (OPP), and biaxially oriented polypropylene (BOPP). The moisture barrier layer 25 may be brought onto the surface of the paper plies 24, or 26 via lamination, extrusion coating, or the like. The moisture barrier layer 25 may be brought onto the surface of the inner polymer ply 22 via lamination, extrusion coating, or coextrusion.

In embodiments, the moisture barrier layer 25 is a dried polymer dispersion, wherein the moisture-resistant coating 25 is applied as a coating in the form of an aqueous or non-aqueous solvent-based polymer dispersion and then dried. Exemplary solvents include water, ethanol, and isopropanol. Exemplary polymers include polyacrylates, latex, waxes (e.g., animal waxes, vegetable waxes, mineral waxes, and petroleum waxes), polystyrenes, and polyolefins (e.g., polyethylenes and polypropylenes). The aqueous or non-aqueous solvent-based polymer dispersion is applied by a suitable coating technique, such as roll coating, roll-to-roll coating, various types of gravure coating, flexographic coating, bar coating, doctor blade coating, comma coating, spraying, or brush coating. The solvent is removed using heat, vacuum, forced hot air, drying oven, and the like.

Figure 4:
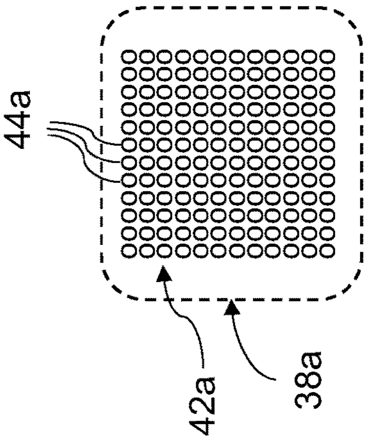
FIG. 4 illustrates a conventional adhesive dot pattern for securing the plies in a conventional oil/grease resistant multiwall bag.

Referring now to FIG. 4, there appears an exemplary adhesive region 38*a* having glue spots 44*a* applied in a conventional grid pattern 42*a* as may be utilized in a typical multiwall bag having single adhesive layer, such as multiwall bag comprising a polymer inner liner which is fully laminated to an intermediate paper layer and which, in turn, is adhesively laminated to an outer paper layer. In the illustrated embodiment, the adhesive dot grid pattern 42*a* comprises 12 horizontal (in the orientation shown in FIG. 4) rows and 12 vertical (in the orientation shown in FIG. 4) columns.

However, in the bag construction 10, there are two overlapping and coextensive adhesive layers 32, 34 in the adhesive region 38 on the front panel 12 are well as two over lapping and coextensive adhesive layers 32, 34 in the adhesive region 40 on the rear panel 14. In order to reduce the stiffness caused by the two overlapping adhesive layers in each of the regions 38, 40, the present development, the adhesive layer 32 utilizes a first glue spot pattern and the adhesive layer 34 utilizes a second glue spot pattern, wherein the glue spots of the adhesive layer 32 do not overlap with or overlie the glue spots of the adhesive layer 34.

In certain embodiments, the first adhesive layer 32 in the region 38 utilizes a glue spot pattern comprising a first plurality of glue spots and a first plurality of interstices disposed between the glue spots, and the second adhesive layer 34 utilizes a glue spot pattern comprising a second plurality of glue spots and a second plurality of interstices disposed between the glue spots, wherein the glue spots in the first adhesive layer 32 are aligned with the interstices in the second adhesive layer 34 and the glue spots in the second adhesive layer 34 are aligned with the interstices in the first adhesive layer 32.

Since the glue spots within the first adhesive layer 32 are aligned with the interstices within the second adhesive layer 34 and vice versa, there will be no point within the adhesive region 38 where glue spots in the first adhesive layer 32 overlap with glue spots in the second adhesive layer 34, thereby reducing the stiffness of the bag construction 10.

Likewise, the first adhesive layer 32 in the region 40 utilizes a glue spot pattern comprising a first plurality of glue spots and a first plurality of interstices disposed between the glue spots, and the second adhesive layer 34 utilizes a glue spot pattern comprising a second plurality of glue spots and a second plurality of interstices disposed between the glue spots, wherein the glue spots in the first adhesive layer 32 are aligned with the interstices in the second adhesive layer 34 and the glue spots in the second adhesive layer 34 are aligned with the interstices in the first adhesive layer 32.

Since the glue spots within the first adhesive layer 32 are aligned with the interstices within the second adhesive layer 34 and vice versa, there will be no point within the adhesive region 40 where glue spots in the first adhesive layer 32 overlap with glue spots in the second adhesive layer 34, thereby reducing the stiffness of the bag construction 10.

Figure 5A:
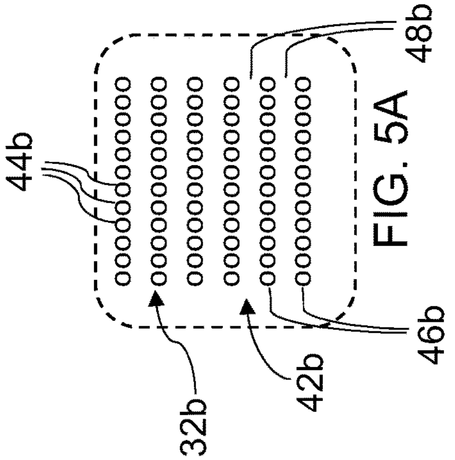
FIGS. 5A and 5B illustrate a first exemplary adhesive dot pattern for adhesively securing adjacent pairs of plies in the multiwall packaging structure of FIG. 1.
Figure 5B:
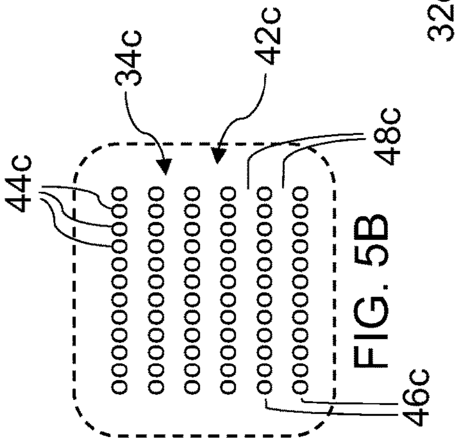

Referring now to FIGS. 5A and 5B, FIG. 5A illustrates an exemplary embodiment adhesive layer 32*b* applied in an adhesive spot pattern 42*b*, which is disposed within the glue region 38 (see FIG. 1). The pattern 42*b* comprises a plurality of glue spots 44*b* arranged in horizontal rows 46*b*, which alternate with interstitial rows 48*b* which are void of glue spots. FIG. 5B illustrates an adhesive layer 34*c* which is applied in an adhesive spot pattern 42*c*, likewise disposed within the glue region 38 (see FIG. 1). The pattern 42*c* comprises a plurality of glue spots 44*c* arranged in horizontal rows 46*c* which alternate with interstitial rows 48*c*, which are void of glue spots.

The patterns 42*b* and 42*c* are complementary in that the rows 46*b* are offset with respect to the rows 46*c* such that the rows 46*b* are aligned with the interstitial rows 48*c* and the rows 46*c* are aligned with the interstitial rows 48*b*, such that the glue spots 44*b* of the adhesive layer 32*b* do not overlap with or overlie the glue spots 44*c* of the adhesive layer 34*c*.

The glue spot patterns appearing in FIGS. 5A and 5B are equally suitable for the adhesive region 40 of the rear panel 14.

Figure 6A:
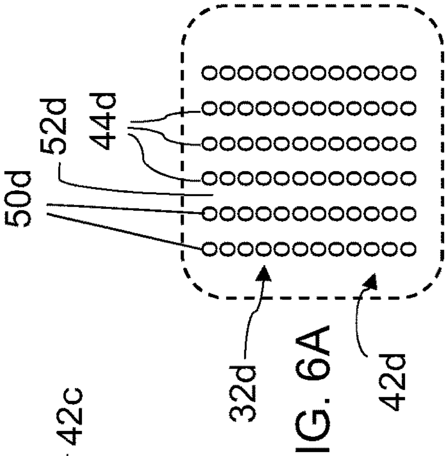
FIGS. 6A and 6B illustrate a second exemplary adhesive dot pattern for adhesively securing adjacent pairs of plies in the multiwall packaging structure of FIG. 1.
Figure 6B:
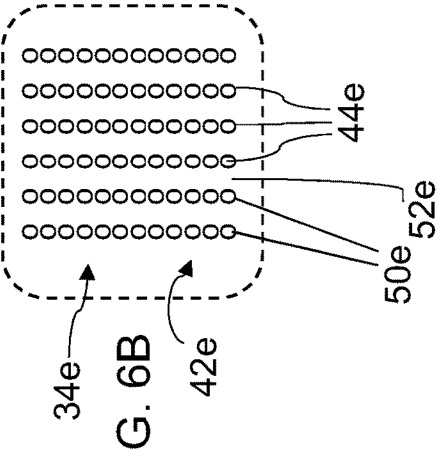

Referring now to FIGS. 6A and 6B, FIG. 6A illustrates another exemplary embodiment adhesive layer 32*d* applied in an adhesive spot pattern 42*d*, which is disposed within the glue region 38 (see FIG. 1). The pattern 42*d* comprises a plurality of glue spots 44*d* arranged in vertical columns 50*d*, which alternate with interstitial columns 52*d*, which are void of glue spots. FIG. 6B illustrates an adhesive layer 34*e* which is applied in an adhesive spot pattern 42*e*, likewise disposed within the glue region 38 (see FIG. 1). The pattern 42*e* comprises a plurality of glue spots 44*e* arranged in vertical columns rows 50*e* which alternate with interstitial columns 52*e*, which are void of glue spots.

The patterns 42*d* and 42*e* are complementary in that the columns 50*d* are offset with respect to the columns 50*e* such that the columns 50*d* are aligned with the interstitial columns 52*e* and the columns 50*e* are aligned with the interstitial columns 52*d*, such that the glue spots 44*d* of the adhesive layer 32*d* do not overlap with or overlie the glue spots 44*e* of the adhesive layer 34*e*.

The glue spot patterns appearing in FIGS. 6A and 6B are equally suitable for the adhesive region 40 of the rear panel 14.

Figure 7A:
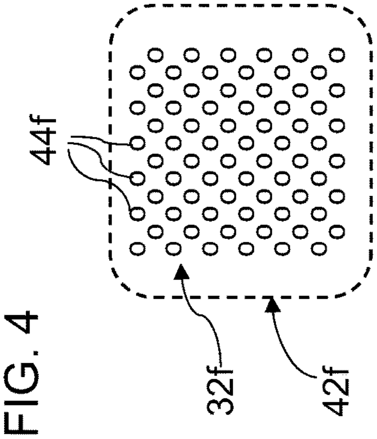
FIGS. 7A and 7B illustrate a third exemplary adhesive dot pattern for adhesively securing adjacent pairs of plies in the multiwall packaging structure of FIG. 1.
Figure 7B:
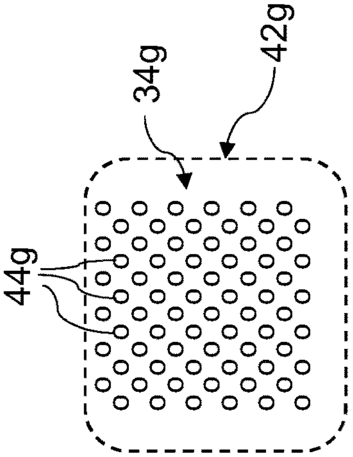

Referring now to FIGS. 7A and 7B, FIG. 7A illustrates another exemplary embodiment adhesive layer 32*f* applied in an adhesive spot pattern 42*f*, which is disposed within the glue region 38 (see FIG. 1). The pattern 42*f* comprises a plurality of glue spots 44*f* arranged in checkerboard pattern of alternating glue spots 44*f* and interstices disposed between adjacent glue spots 44*f*. FIG. 7B illustrates an adhesive layer 34*g* which is applied in an adhesive spot pattern 42*g*, likewise disposed within the glue region 38 (see FIG. 1). The pattern 42*g* comprises a plurality of glue spots 44*g* arranged in checkerboard pattern of alternating glue spots 44*g* and interstices disposed between adjacent glue spots 44*g*.

The patterns 42*f* and 42*g* are complementary in that the glue spots 44*f* are located on the "white" locations on the checkerboard and the glue spots 44*g* are located on the "black" locations on the checkerboard, such that the glue spots 44*f* of the adhesive layer 32*f* do not overlap with or overlie the glue spots 44*g* of the adhesive layer 34*g*.

The glue spot patterns appearing in FIGS. 7A and 7B are equally suitable for the adhesive region 40 of the rear panel 14.

In certain embodiments, the first and second adhesive layers, which may be the same adhesive or different adhesives, may comprise any suitable adhesive for gluing the plies, including without limitation, water-based adhesives, pressure sensitive adhesives, acrylic-based adhesives, styrene copolymer adhesives, rubber-based adhesives, and the like. In certain embodiments, the adhesives utilized are water-based adhesives that have co-polymer chemistries as would be understood by persons skilled in the art. In certain embodiments, pressure sensitive adhesives can advantageously be used to reduce the stiffness throughout the bag, but run the risk of adversely affecting the palatability testing for certain applications.

In the manufacture of the bag construction 10, after the plies 22, 24, and 26 are glued to form the multi-ply web 30 which can be printed, cut, and glued or sealed to form the bag 10. In certain embodiments, the bag 10 is formed using a hot melt adhesive although other adhesives can be used as well, including the adhesives described above for gluing the plies.

The 3M kit test is a standard method for testing oil or grease resistance of paper/film substrates. There are 12 levels of aggressive oils/greases, with 12 being the most aggressive, that are applied to a substrate to determine the oil/grease resistance. The paper plies utilized in the present packaging structure are able to withstand and resist the oil/grease of all 12 oils, receiving a Kit level of 12, as shown in Table 1.

TABLE 1

| Paper Substrate | Kit Level |
|---|---|
| 40# Natural Kraft Converting | 3 |
| 40# Bleached Paper | 3 |
| Clay-Coated Bleached Paper | 4 |
| Clay-Coated Bleached Fluorochemical Treated Paper | 11 |
| Oil/Grease Resistant Bleached Paper | 12 |
| Oil/Grease Resistant Natural Kraft Paper | 12 |
| Polymer films (PET, PE, OPP, etc.) | 11-12 |

Edge wick testing involves the bags in accordance with this disclosure being filled with greasy/fatty pet food, and placed in an environmental chamber for accelerated testing. The bags are placed on a brown Kraft paper in the oven, to help show if oil or grease seeps through the bags, and into the brown paper. The chamber conditions are set at ambient humidity and a temperature of 140° F. (60° C.). The bags are tested for minimum of 24 hours up to 72 hours, and then evaluated to see if there is any visible oil/grease stains on the outer paper ply of the bag. The bags herein pass edge wick testing, even with an aggressive combination of fat/oil/fatty acid.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A paper-based packaging article, comprising:

an outer paper ply;

an intermediate paper ply; and an inner polymer film ply;

a first adhesive layer disposed between the inner polymer film ply and the intermediate paper ply, the first adhesive layer securing the inner polymer film ply to the intermediate paper ply;

a second adhesive layer disposed between the intermediate paper ply and the outer paper ply, the second adhesive layer securing the intermediate paper ply to the outer paper ply wherein the first adhesive layer and the second adhesive layer are coaligned on the multiwall structure;

wherein the outer paper ply, the intermediate paper ply, and the inner polymer film ply are adjoined to form a multiwall structure;

wherein the first adhesive layer comprises a first plurality of adhesive spots and the second adhesive layer comprises a second plurality of adhesive spots, wherein the adhesive spots of the first plurality of adhesive spots do not overlap with the adhesive spots of the second plurality of adhesive spots;

wherein the first plurality of adhesive spots defines a grid pattern comprising a plurality of rows and a plurality of columns; and wherein the second plurality of adhesive spots defines a grid pattern comprising a plurality of rows and a plurality of columns.

2. The paper-based packaging article of claim 1, wherein the inner polymer film ply is selected from the group consisting of a polyolefin-based polymer film and a polyester-based polymer film.

3. The paper-based packaging article of claim 2, wherein the inner polymer film ply is formed of oriented polypropylene.

4. The paper-based packaging article of claim 1, wherein a weight of the inner polymer film ply is in the range of 2% to 10% by weight of a total weight of the paper-based packaging article.

5. The paper-based packaging article of claim 1, wherein a weight of the inner polymer film ply is in the range of 4% to 8% by weight of a total weight of the paper-based packaging article.

6. The paper-based packaging article of claim 1, further comprising a moisture barrier layer disposed on at least one surface of one or more of the outer paper ply, the intermediate paper ply, and the inner polymer film ply.

7. The paper-based packaging article of claim 6, wherein a weight of the inner polymer film ply plus a weight of the moisture barrier layer is in the range of 2% to 10% by weight of a total weight of the paper-based packaging article.

8. The paper-based packaging article as recited in claim 1, wherein the outer paper ply is selected from the group consisting of:

a highly refined paper substrate which is inherently grease resistant; and a paper substrate having one or both of an oil and/or grease resistant coating and an oil and/or grease resistance additive blended into the paper.

9. The paper-based packaging article as recited in claim 1, wherein each of the inner polymer film ply, intermediate paper ply, and the outer paper ply do not contain any fluorochemicals.

10. The paper-based packaging article as recited in claim 1, further comprising:

a printed ink layer disposed on an outward facing surface of the outer paper ply.

11. The paper-based packaging article as recited in claim 10, wherein the printed ink layer is selected from the group consisting of a solvent-free ink, energy-cured ink, water-based ink, and a solvent-based ink.

12. The paper-based packaging article as recited in claim 10, wherein the printed ink layer is selected from the group consisting of an electron beam-cured ink and a UV-cured ink.

13. The paper-based packaging article as recited in claim 10, further comprising an overprint varnish or lacquer disposed on the printed ink layer.

14. The paper-based packaging article as recited in claim 1, wherein the plurality of rows of the grid patterns of the first and second plurality of adhesive spots extend in a transverse direction which is perpendicular to a machine direction, and further wherein the plurality of rows of the grid pattern of the first plurality of adhesive spots are offset in the machine direction with respect to the plurality of rows of the grid pattern of the second plurality of adhesive spots.

15. The paper-based packaging article as recited in claim 1, wherein the plurality of columns of the grid patterns of the first and second plurality of adhesive spots extends in a machine direction which is perpendicular to a transverse direction, and further wherein the plurality of columns of the grid pattern of the first plurality of adhesive spots are offset in the transverse direction with respect to the plurality of columns of the grid pattern of the second plurality of adhesive spots.

16. The paper-based packaging article as recited in claim 1, wherein each of the first plurality of adhesive spots and the second plurality of adhesive spots comprise an alternating pattern of adhesive spots and interstices, and further wherein the adhesive spots of the first plurality of adhesive spots are aligned with the interstices of the second plurality of adhesive spots.

17. The paper-based packaging article as recited in claim 1, wherein the paper-based packaging article is a bag.

18. The paper-based packaging article as recited in claim 17, wherein the bag has a front panel, a back panel, and opposing side panels joining the front and back panels.

19. The paper-based packaging article as recited in claim 18, wherein the opposing side panels are gusseted.

20. The paper-based packaging article as recited in claim 17, wherein the bag is closed at a first end and open at a second end opposite the first end.

21. The paper-based packaging article as recited in claim 1, wherein the paper-based packaging article is selected from the group consisting of a bag, pouch, overwrap, self-opening sack (SOS) bag, pinch bottom pouch, pinch bottom open mouth (PBOM) bag, and quad seal side gusseted bag.

22. The paper-based packaging article as recited in claim 1, wherein the paper-based packaging article is a pet food bag.

23. The paper-based packaging article as recited in claim 22, wherein the multiwall structure is configured to resist bleed through of oil and/or grease from within the paper-based packaging article.

24. The paper-based packaging article as recited in claim 1, wherein said multiwall structure includes:

a pair of substantially rectangular, opposing front and back panels, each having top and bottom ends and opposing side edges extending between the top and bottom ends;

a pair of opposing side panels joining the opposing side edges of the front and back panels; and a closure securing the bottom ends of the front and back panels and the pair of side panels to close one end of the bag.

25. The paper-based packaging article as recited in claim 24, wherein the first and second adhesive layers are disposed on one or both of the front panel and the back panel.

26. The paper-based packaging article as recited in claim 24, wherein each of the side panels has a longitudinal accordion pleat defining a longitudinal gusset fold therein.

27. The paper-based packaging article as recited in claim 24, wherein the paper-based packaging article is a pet food bag.

28. A method of forming a packaging article, comprising the steps of:

providing an outer web formed of a first paper material;

providing an intermediate web formed of a second paper material;

providing an inner web formed of a polymer film;

applying a first adhesive layer to a first predefined region on one of an outward facing surface of the inner web and an inward facing surface of the intermediate web;

applying a second adhesive layer to a second predefined region on one of an outward facing surface of the intermediate web and an inward facing surface of the outer web;

gluing the outer web, the intermediate web, and the inner web to form a multiwall structure comprising an outer paper ply, an intermediate paper ply, and an inner polymer film ply, wherein the first predefined region and the second predefined region are coaligned;

wherein the first adhesive layer comprises a first plurality of adhesive spots and the second adhesive layer comprises a second plurality of adhesive spots, wherein the adhesive spots of the first plurality of adhesive spots do not overlap with the adhesive spots of the second plurality of adhesive spots;

wherein the first plurality of adhesive spots defines a grid pattern comprising a plurality of rows and a plurality of columns; and wherein the second plurality of adhesive spots defines a grid pattern comprising a plurality of rows and a plurality of columns.

29. The method of claim 28, further comprising:

folding the multiwall structure to form a pair of substantially rectangular, opposing front and back panels, each having top and bottom ends and opposing side edges extending between the top and bottom ends and a pair of opposing side panels joining the opposing side edges of the front and back panels; and securing the bottom ends of the front and back panels and the pair of side panels to close one end of the bag.

30. A paper-based packaging article, comprising:

an outer paper ply;

an intermediate paper ply; and an inner polymer film ply;

a first adhesive layer disposed between the inner polymer film ply and the intermediate paper ply, the first adhesive layer securing the inner polymer film ply to the intermediate paper ply;

a second adhesive layer disposed between the intermediate paper ply and the outer paper ply, the second adhesive layer securing the intermediate paper ply to the outer paper ply;

wherein the outer paper ply, the intermediate paper ply, and the inner polymer film ply are adjoined to form a multiwall structure;

wherein the paper-based packaging article is repulpable, recyclable, and grease resistant;

wherein the first adhesive layer and the second adhesive layer are coaligned on the multiwall structure;

wherein the first adhesive layer comprises a first plurality of adhesive spots and the second adhesive layer comprises a second plurality of adhesive spots;

wherein the adhesive spots of the first plurality of adhesive spots do not overlap with the adhesive spots of the second plurality of adhesive spots;

wherein the first plurality of adhesive spots defines a grid pattern comprising a plurality of rows and a plurality of columns; and wherein the second plurality of adhesive spots defines a grid pattern comprising a plurality of rows and a plurality of columns.

* * * * *